US012774220B2

(12) United States Patent
Natsui et al.

(10) Patent No.: US 12,774,220 B2
(45) Date of Patent: Oct. 27, 2026

(54) POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

(71) Applicant: PANASONIC INTELLECTUAL PROPERTY MANAGEMENT CO., LTD., Osaka (JP)

(72) Inventors: Ryuichi Natsui, Osaka (JP); Mitsuhiro Hibino, Kyoto (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 670 days.

(21) Appl. No.: 17/798,965

(22) PCT Filed: Feb. 10, 2021

(86) PCT No.: PCT/JP2021/004882
§ 371 (c)(1),
(2) Date: Aug. 11, 2022

(87) PCT Pub. No.: WO2021/172010
PCT Pub. Date: Sep. 2, 2021

(65) Prior Publication Data
US 2023/0071732 A1 Mar. 9, 2023

(30) Foreign Application Priority Data
Feb. 28, 2020 (JP) ................................ 2020-033489

(51) Int. Cl.
*H01M 4/525* (2010.01)
*H01M 4/485* (2010.01)
(Continued)

(52) U.S. Cl.
CPC .......... *H01M 4/525* (2013.01); *H01M 4/485* (2013.01); *H01M 4/505* (2013.01);
(Continued)

(58) Field of Classification Search
CPC ...... H01M 4/525; H01M 4/485; H01M 4/505; H01M 2004/028
(Continued)

(56) References Cited

U.S. PATENT DOCUMENTS 9,586,834 B2 3/2017 Yamamoto et al.
2004/0202938 A1 10/2004 Noguchi et al.
(Continued)

FOREIGN PATENT DOCUMENTS

CN 103069622 A 4/2013
CN 103078103 A 5/2013
(Continued)

OTHER PUBLICATIONS

International Search Report dated Apr. 13, 2021, issued in counterpart Application No. PCT/JP2021/004882, with English Translation. (5 pages).
(Continued)

*Primary Examiner* — Osei K Amponsah
*Assistant Examiner* — Kevin Nguyen
(74) *Attorney, Agent, or Firm* — WHDA, LLP

(57) ABSTRACT

This positive electrode active material for a non-aqueous electrolyte secondary battery contains a lithium transition metal composite oxide represented by the composition formula $Li_xMn_yNi_zAl_aM_bO_{2-c}F_c$ (in the formula, M represents at least two elements selected from Ti, Co, Si, Sr, Nb, W, Mo, P, Ca, Mg, Sb, Na, B, V, Cr, Fe, Cu, Zn, Ge, Zr, Ru, K, and Bi; $1.0<x\leq1.2$; $0.4\leq y\leq0.8$; $0\leq z\leq0.4$; $0<a<0.01$; $0<b<0.03$; $0<c<0.1$; and $x+y+z+a+b\leq2$).

3 Claims, 1 Drawing Sheet

(51) Int. Cl.

| | |
|---|---|
| ***H01M 4/505*** | (2010.01) |
| ***H01M 10/0525*** | (2010.01) |
| ***H01M 50/46*** | (2021.01) |
| *H01M 4/02* | (2006.01) |

(52) U.S. Cl.
CPC ....... *H01M 10/0525* (2013.01); *H01M 50/46* (2021.01); *H01M 2004/028* (2013.01)

(58) Field of Classification Search
USPC ..................................................... 429/231.95
See application file for complete search history.

(56) References Cited

U.S. PATENT DOCUMENTS

| | | | | |
|---|---|---|---|---|
| 2005/0058588 | A1* | 3/2005 | Kang .................... | H01M 4/505 429/231.1 |
| 2006/0216601 | A1* | 9/2006 | Komiyama ........... | H01M 4/136 429/223 |
| 2010/0086854 | A1* | 4/2010 | Kumar .................. | H01M 4/505 429/231.95 |
| 2013/0168599 | A1 | 7/2013 | Kato et al. | |
| 2013/0209871 | A1 | 8/2013 | Kato et al. | |
| 2016/0336594 | A1 | 11/2016 | Ahn et al. | |
| 2017/0040594 | A1* | 2/2017 | Yamaki ............... | H01M 4/1315 |
| 2018/0090760 | A1* | 3/2018 | Natsui .................. | H01M 4/485 |
| 2019/0115596 | A1 | 4/2019 | Kajiyama et al. | |
| 2019/0181443 | A1 | 6/2019 | Ikeuchi et al. | |
| 2021/0057717 | A1 | 2/2021 | Natsui et al. | |
| 2021/0167357 | A1 | 6/2021 | Natsui et al. | |

FOREIGN PATENT DOCUMENTS

| | | | | |
|---|---|---|---|---|
| CN | 108886144 | A | 11/2018 | |
| CN | 111435739 | A * | 7/2020 | ............. C01G 53/42 |
| JP | 2000-243394 | A | 9/2000 | |
| JP | 2003-229130 | A | 8/2003 | |
| JP | 4197002 | B2 | 12/2008 | |
| WO | 2018/092359 | A1 | 5/2018 | |
| WO | 2019/230101 | A1 | 12/2019 | |
| WO | 2020/049793 | A1 | 3/2020 | |

OTHER PUBLICATIONS

Written Opinion dated Apr. 13, 2021, issued in counterpart Application No. PCT/JP2021/004882. (4 pages).

Office Action dated Aug. 27, 2024, issued in counterpart CN application No. 202180015436.6, with partial English translation. (8 pages).

Extended (Supplementary)European Search Report dated Aug. 2, 2023, issued in counterpart EP Application No. 21761424.7. (5 pages).

* cited by examiner

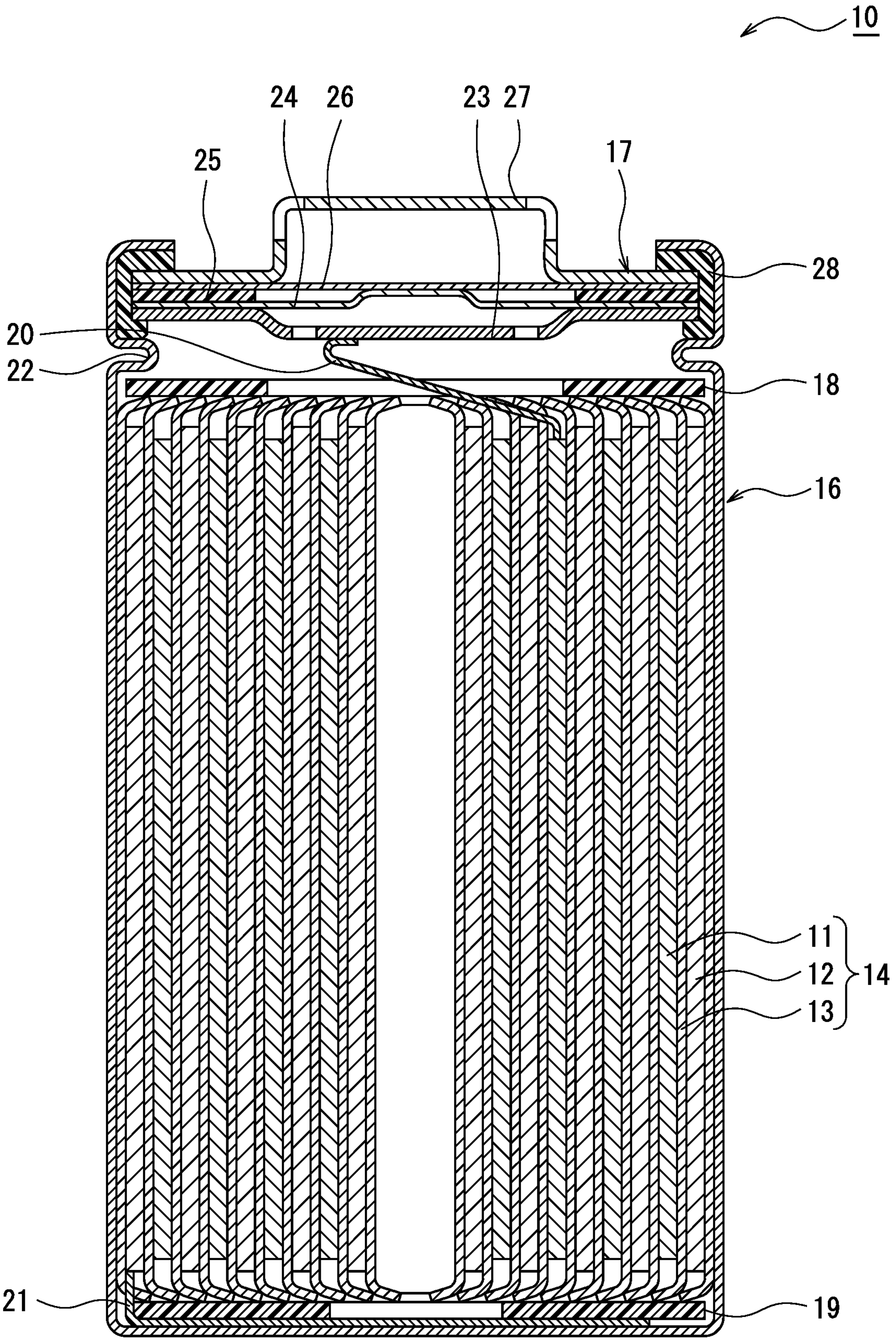
10
24
26
23
27
25
17
28
20
22
18
16
11
12
13
14
21
19

POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/004882 filed on Feb. 10, 2021 which claims the benefit of priorities under 35 U.S.C. § 119(a) of Japanese Patent Application No. 2020-033489 filed in Japan on Feb. 28, 2020, the contents of which are incorporated herein by reference.

TECHNICAL FIELD

The present disclosure relates to a positive electrode active material for a non-aqueous electrolyte secondary battery, and to a non-aqueous electrolyte secondary battery which uses the positive electrode active material.

BACKGROUND

In non-aqueous electrolyte secondary batteries such as lithium ion batteries, a positive electrode active material significantly affects battery performances such as input/output characteristic, capacity, cycle characteristic, or the like. For the positive electrode active material, in general, a lithium-transition metal composite oxide which contains a metal element such as Ni, Co, Mn, Al, or the like, is used. Because properties of the lithium-transition metal composite oxides significantly vary depending on compositions thereof, there have been various studies on a type and an amount of an element to be added.

For example, Patent Literature 1 discloses a positive electrode active material for a non-aqueous electrolyte secondary battery, wherein the positive electrode active material is represented by a composition formula $Li_xNi_{1-y}Co_{y-z}M_zO_{2-a}X_b$ (wherein M is at least Al), a lattice constant of au a axis measured by X-ray diffraction is 2.81~2.91 Å, the lattice constant of a c axis is 13.7~14.4 Å, and a ratio of a diffraction peak intensity of a (104) plane with respect to a peak intensity of a (003) plane is 0.3~0.8.

CITATION LIST

Patent Literature

PATENT LITERATURE 1: JP 4197002 B

SUMMARY

There has also been proposed a lithium-excess composite oxide in which a molar ratio of Li with respect to the transition metal exceeds 1. The lithium-excess composite oxides are highly expected as next-generation positive electrode active materials of high capacity, but there remains problems such as that the transition metal tends to easily elute. While it is known that the elution of the transition metal can be suppressed by adding F to the lithium-excess composite oxide and the endurance can be improved, in this case, there is a problem in that the resistance is increased and the capacity is reduced.

According to one aspect of the present disclosure, there is provided a positive electrode active material for a non-aqueous electrolyte secondary battery, including a lithium-transition metal composite oxide represented by a composition formula $Li_xMn_yNi_zAL_aM_bO_{2-c}F_c$ (wherein M is two or more elements selected from Ti, Co, Si, Sr, Nb, W, Mo, P, Ca, Mg, Sb, Na, B, V, Cr, Fe, Cu, Zu, Ge. Zr, Ru, K, and Bi, $1.0<x\leq1.2$, $0.4\leq y\leq0.8$, $0\leq z\leq0.4$, $0<a<0.01$, $0<b<0.03$, $0<c<0.1$, and $x+y+z+a+b\leq2$).

According to another aspect of the present disclosure, there is provided a non-aqueous electrolyte secondary battery including a positive electrode including the positive electrode active material, a negative electrode, a separator interposed between the positive electrode and the negative electrode, and a non-aqueous electrolyte.

According to an aspect of the present disclosure, a positive electrode active material of high capacity can be provided. With the positive electrode active material of the present disclosure, high capacity and high endurance can both be realized.

BRIEF DESCRIPTION OF DRAWINGS

FIG. 1 is a cross-sectional diagram of a non-aqueous electrolyte secondary battery according to an embodiment of the present disclosure.

DESCRIPTION OF EMBODIMENTS

When F is added to the lithium-excess composite oxide as described above, while the endurance can be improved through suppression of the elution of the transition metal, the resistance is increased and the capacity is consequently reduced. In lithium-transition metal composite oxides, when a large number of Li detach, the crystal structure tends to become unstable, but the structure can be stabilized by adding Al. Thus, adding Al enables charging to a high voltage, resulting in a higher capacity. However, the addition of Al alone cannot result in capacity which is as high as expected.

The present inventors have eagerly studied in order to solve the above-described problem, and found that high capacity can be realized by adding Al and two or more particular elements to a lithium-excess, F-containing composite oxide which contains at least Mu as the transition metal. When Al and two or more particular elements are added, for example, the capacity is singularly improved in comparison to a case in which Al and one particular element are added.

A positive electrode active material for a non-aqueous electrolyte secondary battery and a non-aqueous electrolyte secondary battery which uses the positive electrode active material according to an embodiment of the present disclosure will now be described in detail with reference to the drawings. Selective combination of a plurality of embodiments and alternative configurations described below is contemplated from the beginning.

In the following, a circular cylindrical battery in which a rolled type electrode assembly 14 is housed in an outer housing can 16 of a circular cylindrical shape with a bottom will be exemplified. However, the outer housing is not limited to the circular cylindrical outer housing can, and may alternatively be, for example, a rectangular outer housing can (rectangular battery), a coin-shape outer housing can (coin-shape battery), or an outer housing (laminated battery) formed from laminated sheets including a metal layer and a resin layer. Alternatively, the electrode assembly may be a layered type electrode assembly in which a plurality of positive electrodes and a plurality of negative electrodes are alternately layered with separators therebetween.

FIG. 1 is a cross-sectional diagram of a non-aqueous electrolyte secondary battery 10 according to an embodiment of the present disclosure. As shown in FIG. 1, the non-aqueous electrolyte secondary battery 10 includes the electrode assembly 14 of the rolled type, a non-aqueous electrolyte, and the outer housing can 16 which houses the electrode assembly 14 and the non-aqueous electrolyte. The electrode assembly 14 includes a positive electrode 11, a negative electrode 12, and a separator 13, and has a rolled structure in which the positive electrode 11 and the negative electrode 12 are rolled in a spiral form with the separator 13 therebeween. The outer housing can 16 is a metal container having a circular cylindrical shape with a bottom, which is opened in one side in an axial direction, and the opening of the outer housing can 16 is blocked by a sealing assembly 17. In the following, for convenience of description, a side of the battery near the sealing assembly 17 will be refened to as an "upper side", and a side near a bottom of the outer housing can 16 will be referred to as a "lower side".

The non-aqueous electrolyte includes a non-aqueous solvent, and an electrolyte salt dissolved in the non-aqueous solvent. For the non-aqueous solvent, for example, esters, ethers, nitriles, amides, or a mixed solvent of two or more of these solvents is used. The non-aqueous solvent may include a halogen-substituted product in which at least a part of hydrogens of the solvent described above is substituted with a halogen atom such as fluorine. For the electrolyte salt, for example, a lithium salt such as $LiPF_6$ is used. The non-aqueous electrolyte is not limited to a liquid electrolyte, and may alternatively be a solid electrolyte.

Each of the positive electrode 11, the negative electrode 12, and the separator 13 of the electrode assembly 14 is a band-shape, elongated element, and is alternately layered in a radial direction of the electrode assembly 14 by being rolled in the spiral form. The negative electrode 12 is formed in a slightly larger size than the positive electrode 11 in order to prevent deposition of lithium. That is, the negative electrode 12 is formed longer than the positive electrode 11 in a longitudinal direction and a width direction (short side direction. Two separators 13 are formed in a slightly larger size than at least the positive electrode 11, and are placed, for example, to sandwich the positive electrode 11. The electrode assembly 14 has a positive electrode lead 20 connected to the positive electrode 11 by welding or the like, and a negative electrode lead 21 connected to the negative electrode 12 by welding or the like.

Insulating plates 18 and 19 are placed respectively above and below the electrode assembly 14. In the example structure shown in FIG. 1, the positive electrode lead 20 extends through a through hole of the insulating plate 18 toward the side of the sealing assembly 17, and the negative electrode lead 21 extends to the side of the bottom of the outer housing can 16 through an outer side of the insulating plate 19. The positive electrode lead 20 is connected to a lower surface of an internal terminal plate 23 of the sealing assembly 17 by welding or the like, and a cap 27 which is a top plate of the sealing assembly 17 electrically connected to the internal terminal plate 23 serves as a positive electrode terminal. The negative electrode lead 21 is connected to an inner surface of the bottom of the outer housing can 16 by welding or the like, and the outer housing can 16 serves as a negative electrode terminal.

A gasket 28 is provided between the outer housing can 16 and the sealing assembly 17, so as to secure airtightness of the inside of the battery. On the outer housing can 16, a groove portion 22 is formed by a part of a side surface portion being protruded to the inner side, and supports the sealing assembly 17. The groove portion 22 is desirably formed in an annular shape along a circumferential direction of the outer housing can 16, and supports the sealing assembly 17 with the upper surface thereof. The sealing assembly 17 is fixed at an upper part of the outer housing can 16 by the groove portion 22 and an opening end of the outer housing can 16 fastened on the sealing assembly 17.

The sealing assembly 17 has a structure in which the internal terminal plate 23, a lower vent member 24, an insulating member 25, an upper vent member 26, and the cap 27 are layered in this order from the side of the electrode assembly 14. The members of the sealing assembly 17 have, for example, a circular disk shape or a ring shape, and members other than the insulating member 25 are electrically connected to each other. The lower vent member 24 and the upper vent member 26 are connected to each other at respective center parts, and the insulating member 25 interposes between peripheral parts of the vent members. When an inner pressure of the battery increases due to abnormal heat generation, the lower vent member 24 deforms to press the upper vent member 26 upward toward the cap 27 and ruptures, and a current path between the lower vent member 24 and the upper vent member 26 is shut out. When the inner pressure further increases, the upper vent member 26 ruptures, and gas is discharged from an opening of the cap 27.

The positive electrode 11, the negative electrode 12, and the separator 13 forming the electrode assembly 14 will now be described in detail. In particular, a positive electrode active material included in the positive electrode 11 will be described in detail.

[Positive Electrode]

The positive electrode 11 comprises a positive electrode core and a positive electrode mixture layer provided over a surface of the positive electrode core. For the positive electrode core, there may be employed a foil of a metal which is stable within a potential range of the positive electrode 11 such as aluminum and an aluminum alloy, a film on a surface layer of which the metal is placed, or the like. The positive electrode mixture layer includes a positive electrode active material, a conductive agent, and a binder agent, and is desirably provided on both surfaces of the positive electrode core. The positive electrode 11 can be produced, for example, by applying a positive electrode mixture shiny including the positive electrode active material, the conductive agent, the binder agent, or the like over the positive electrode core, drying the applied film, and compressing the dried film to form the positive electrode mixture layer over both surfaces of the positive electrode core.

As the conductive agent included in the positive electrode mixture layer, there may be exemplified carbon materials such as carbon black, acetylene black, Ketjen black, graphite, or the like. As the binder agent included in the positive electrode mixture layer, there may be exemplified a fluororesin such as polytetrafluoroethylene (PTFE), polyvinylidene fluoride (PVdF), polyaciylonitrile (PAN), a polyimide resin, an acrylic resin, a polyolefin resin, or the like. These resins may be used in combination with a cellulose derivative such as carboxymethyl cellulose (CMC) or a salt thereof, polyethylene oxide (PEO), or the like.

The positive electrode active material includes a lithium-transition metal composite oxide represented by a composition formula $Li_xMn_yNi_zAL_aM_bO_{2-c}F_c$ (wherein M is two or more elements selected from Ti, Co, Si, Sr, Nb, W, Mo, P, Ca, Mg, Sb, Na, B, V, Cr, Fe, Cu, Zn, Ge, Zr, Ru, K, and Bi, $1.0<x\leq1.2$, $0.4\leq y\leq0.8$, $0\leq z\leq0.4$, $0<a<0.01$, $0<b<0.03$, $0<c<0.1$, and $x+y+z+a+b\leq2$). The composite oxide is a Li-excess material in which a molar ratio of Li with respect to the transition metal exceeds 1, and a predetermined amount of fluoride ions are introduced so that a part of O is replaced with F.

The positive electrode active material has the composite oxide represented by the above-described composition formula as a primary composition. Here, a primary composition means a composition having the highest mass ratio among the constituting compositions of the composite oxide. In the positive electrode 11, as the positive electrode active material, composite oxides other than the composite oxide represented by the above-described composition formula (for example, a composite oxide which is not Li-excess, or a composite oxide which does not contain fluoride ions) may be additionally provided, but a content of the above-described composite oxide is desirably greater than or equal to 50 mass %, and may be substantially 100 mass %. The composition of the composite oxide can be measured using an ICP emission spectrometry device (iCAP 6300 manufactured by Thermo Fisher Scientific).

The lithium-transition metal composite oxide represented by the above-described composition formula may contain Ni in addition to Li, Mn, and Al. Further, the lithium-transition metal composite oxide contains, as necessary compositions, two or more elements selected from Ti, Co, Si, Sr, Nb, W, Mo, P, Ca, Mg, Sb, Na, B, V, Cr, Fe, Cu, Zn, Ge, Zr, Ru, K, and Bi. Of these, Ti, Co, Nb, Ge, Mg, Si, and Sr are desirable.

In the above-described composition formula, M is particularly desirably two or more elements selected from Ti, Co, and Nb. That is, M is one of (1) Co and Ti, (2) Co and Nb, (3) Ti and Nb, or (4) Co, Ti, and Nb. A molar ratio (b) of M is desirably in a range of $0<b<0.02$, is more desirably in a range of $0.001\leq b\leq0.015$, and is particularly desirably in a range of $0.0002\leq b\leq0.010$. When the element M is a combination selected from (1)~(4) described above, the improvement effect of the capacity is more significant.

In the above-described composition formula, a molar ratio (x) of Li is in a range of $1.0<x\leq1.2$, and is desirably in a range of $1.1\leq x\leq1.2$. A molar ratio (y) of Mn is in a range of $0.4\leq y\leq0.8$, and is desirably in a range of $0.45\leq y\leq0.6$. A molar ratio (a) of Al is in a range of $0<a<0.01$, is desirably in a range of $0.001\leq a\leq0.007$, and is more desirably in a range of $0.002\leq a\leq0.005$. When the molar ratios of Li, Mn, and Al are in these ranges, the improvement effect of the capacity is more significant. Ni is an optional composition, and is desirably contained, for example, in an amount in a range of $0.05\leq z\leq0.3$.

In the lithium-transition metal composite oxide represented by the above-described composition formula, a total molar amount (x+y+z+a+b) of Li, Mn, Ni, Al, and M is 2 or less, and is desirably 2. That is, the composite oxide is desirably a Li-excess composite oxide, and not a cation-excess composite oxide. A molar ratio (c) of F is in a range of $0<c\leq0.1$, and is desirably in a range of $0.05\leq x\leq0.085$. By adding a predetermined amount of F, the elution of the transition metal can be suppressed and the endurance can be improved.

A specific example of a desirable lithium-transition metal composite oxide is a lithium-excess, F-containing composite oxide which contains Mn, Ni, Al, and Co, and contains at least one of Ti or Nb. The composite oxide substantially does not contain, for example, elements other than Mn, Ni, Al, Co, Ti, Nb, Li, O, and F. A molar ratio of each of Co, Ti, and Nb is desirably less than or equal to 0.01, is more desirably in a range of 0.001~0.007, and is particularly desirably in a range of 0.002~ 0.005, and is, for example, less than or equal to a molar ratio of Al.

The lithium-transition metal composite oxide of the embodiment can be synthesized by, for example, mixing a carbonate containing Mn and Ni, compounds respectively containing Al, Co, Ti, Nb, or the like (for example, aluminum hydroxide, cobalt sulfate, titanium oxide, niobium oxide, or the like), and lithium fluoride (LiF), and baking the mixture. Au example of the baking condition is 700~900° C.×10~30 hours.

[Negative Electrode]

The negative electrode 12 includes a negative electrode core and a negative electrode mixture layer provided over a surface of the negative electrode core. For the negative electrode core, there may be employed a foil of metal stable within a potential range of the negative electrode 12 such as copper, a film on a surface layer of which the metal is placed, or the like. The negative electrode mixture layer includes a negative electrode active material and a binder agent, and is desirably provided over both surfaces of the negative electrode core. The negative electrode 12 can be produced, for example, by applying a negative electrode mixture shiny including the negative electrode active material, the conductive agent, the binder agent, or the like over a surface of the negative electrode core, drying the applied film, and compressing the dried film, to form the negative electrode mixture layer over both surfaces of the negative electrode core.

The negative electrode mixture layer includes, as the negative electrode active material, for example, a carbon-based active material which reversibly occludes and releases lithium ions. Desirable examples of the carbon-based active material include graphties such as natural graphites such as flake graphite, massive graphite, amorphous graphite, or the like, and artificial graphites such as massive artificial graphite (MAG), graphitized meso-phase carbon microbeads (MCMB), or the like. Alternatively, an Si-based active material formed from at least one of Si or a Si-containing compound may be used for the negative electrode active material, or the carbon-based active material and the Si-based active material may be used in a combined manner.

As the conductive agent included in the negative electrode mixture layer, similar to the case of the positive electrode 11, there may be employed carbon materials such as carbon black, acetylene black, Ketjen black, graphite, or the like. As the binder agent included in the negative electrode mixture layer, similar to the case of the positive electrode 11, a fluororesin, PAN, polyimide, an acrylic resin, polyolefin, or the like may be employed, but desirably, styrene-butadiene rubber (SBR) is employed. The negative electrode mixture layer desirably further contains CMC or a salt thereof, a polyaciylic acid (PAA) or a salt thereof, polyvinyl alcohol (PVA), or the like. In particular, desirably, SBR, CMC or the salt thereof, and PAA or the salt thereof are used in a combined manner.

[Separator]

For the separator 13, a porous sheet having an ion permeability and an insulating property is employed. Specific examples of the porous sheet include a microporous thin film, a woven fabric, a non-woven fabric, or the like. As a material forming the separator 13, desirably, polyolefin such as polyethylene, polypropylene, and a copolymer of ethylene and a olefm, cellulose, or time like is employed. The separator 13 may have a single-layer structure or a layered structure. On a surface of the separator 13, a heat resistive layer including inorganic particles, and a heat resistive layer formed from a resin of a high heat resistivity such as an aramid resin, polyimide, polyamideimide, or the like may be formed.

EXAMPLES

The present disclosure will now be described in further detail with reference to Examples. The present disclosure, however, is not limited to the Examples.

Example 1

[Synthesis of Lithium-Transition Metal Composite Oxide]

A carbonate containing Mn and Ni in a molar ratio of 2:1, aluminum hydroxide, cobalt sulfate, titanium oxide, and lithium fluoride were mixed, and the mixture was baked at a temperature of 800° C. for 20 hours under an oxygen gas stream, to obtain a lithium-transition metal composite oxide represented by a composition formula $$Li_{1.167}Mn_{0.55}Ni_{0.275}Al_{0.002}Co_{0.002}Ti_{0.002}O_{1.92}F_{0.08}.$$

[Production of Positive Electrode]

The lithium-transition metal composite oxide described above was used as the positive electrode active material. The positive electrode active material, acetylene black, and polyvinylidene fluoride were mixed with a solid content mass ratio of 7:2:1, N-methyl-2-pyrrolidone (NMP) was used as a dispersion medium, and a positive electrode mixture slurry was prepared. Then, the positive electrode mixture shiny was applied over a positive electrode core formed from an aluminum foil, the applied film was dried, the dried film was compressed, and the resulting structure was cut in a predetermined electrode size, to produce a positive electrode.

[Preparation of Non-Aqueous Electrolyte Solution]

Ethylene carbonate (EC), ethyl methyl carbonate (EMC), and dimethyl carbonate (DMC) were mixed in a predetermined volume ratio. $LiPF_6$ was added to the mixture solvent, to obtain a non-aqueous electrolyte solution.

[Production of Test Cell]

The above-described positive electrode and a negative electrode formed from a lithium metal foil were placed opposing each other with a separator therebetween, to form an electrode assembly, and the electrode assembly was housed in an outer housing can of a coin shape. After the above-described non-aqueous electrolyte solution was injected into the outer housing can, the outer housing can was sealed, to obtain a test cell (non-aqueous electrolyte secondary battery) of a coin shape.

For the test cell, an initial capacity was assessed through the following method. Assessment results are shown in TABLEs 1~3, along with compositions of the positive electrode active material.

[Assessment of Initial Capacity]

The test cell was CC-charged under an ordinary temperature environment with a constant current of 0.05 C until a battery voltage reached 5.2 V, the charging was stopped for 20 minutes, the test cell was CC-discharged with a constant current of 0.05 C until the battery voltage reached 2.5 V, and a discharge capacity was measured.

Examples 2~7, Comparative Examples 1~3>

Test cells were produced in a manner similar to Example 1 except that types of raw materials and mixture ratios of the raw materials in the synthesis of the lithium-transition metal composite oxide were changed so that the compositions shown in TABLEs 1~3 were obtained (contents of Ni and Mu were identical to those in Example 1). The initial capacities of the test cells were assessed.

TABLE 1

| | MOLAR RATIOS OF Al AND ELEMENT M IN POSITIVE ELECTRODE ACTIVE MATERIAL | | | | | | | INITIAL CAPACITY |
|---|---|---|---|---|---|---|---|---|
| | Al | Co | Ti | Nb | Ge | Mg | Si | (mAh/g) |
| COMPARATIVE EXAMPLE 1 | 0.0025 | | | | | | | 256.7 |
| EXAMPL 1 | 0.0025 | 0.0025 | 0.0025 | | | | | 268.3 |
| EXAMPL 2 | 0.0025 | 0.0025 | | 0.0025 | | | | 268.5 |
| EXAMPL 3 | 0.0025 | 0.0025 | | | 0.0025 | | | 264.8 |
| EXAMPL 4 | 0.0025 | 0.0025 | | | | 0.0025 | | 261.2 |
| EXAMPL 5 | 0.0025 | 0.0025 | | | | | 0.0025 | 261.3 |
| EXAMPL 6 | 0.0025 | 0.0025 | 0.0025 | 0.0025 | | | | 268.8 |
| EXAMPL 7 | 0.0025 | 0.0025 | 0.0025 | | | | 0.0025 | 263.7 |

TABLE 2

| | MOLAR RATIOS OF Al AND ELEMENT M IN POSITIVE ELECTRODE ACTIVE MATERIAL | | | | | INITIAL CAPACITY |
|---|---|---|---|---|---|---|
| | Al | Co | Ti | Nb | Si | (mAh/g) |
| COMPARATIVE EXAMPLE 2 | 0.0025 | | 0.0025 | | | 262.7 |
| EXAMPL 1 | 0.0025 | 0.0025 | 0.0025 | | | 268.3 |
| EXAMPL 6 | 0.0025 | 0.0025 | 0.0025 | 0.0025 | | 268.8 |
| EXAMPL 7 | 0.0025 | 0.0025 | 0.0025 | | 0.0025 | 263.7 |

TABLE 3

| | MOLAR RATIOS OF Al AND ELEMENT M IN POSITIVE ELECTRODE ACTIVE MATERIAL | | | | INITIAL CAPACITY |
|---|---|---|---|---|---|
| | Al | Co | Ti | Nb | (mAh/g) |
| COMPARATIVE EXAMPLE 3 | 0.0025 | | | 0.0025 | 261.6 |
| EXAMPL 2 | 0.0025 | 0.0025 | | 0.0025 | 268.5 |
| EXAMPL 6 | 0.0025 | 0.0025 | 0.0025 | 0.0025 | 268.8 |

As shown in TABLE 1, the test cells of Examples, in which a positive electrode active material was used in which two or more elements selected from Co, Ti, Nb, Ge, Mg, and Si were added to the lithium-excess, F-containing composite oxide containing Mn, Ni, and Al, had higher capacities than the test cell of Comparative Example 1 which did not contain Co, Ti, or the like. In particular, in the test cells of Examples 1, 2, and 6 respectively using the composite oxides containing Co and Ti, Co and Nb, and Co, Ti, and Nb, the initial capacity was significantly improved.

As shown in TABLE 2, a high capacity cannot be achieved by merely adding Ti to the lithium-excess, F-containing composite oxide containing Mn, Ni, and Al, but the capacity of the test cell can be singularly improved by adding Co, Nb, Si, or the like, in addition to Ti.

Similarly, as shown in TABLE 3, although a high capacity cannot be achieved by merely adding Nb to the lithium-excess, F-containing composite oxide containing Mn, Ni, and Al, the capacity of the test cell can be singularly improved by adding Co, Ti, or the like, in addition to NU.

As described, the capacity can be significantly improved by adding two or more particular elements selected from Co, Ti, Nb, or the like, along with Al, to the lithium-excess, F-containing composite oxide containing at least Mn as the transition metal.

REFERENCE SIGNS LIST

10 non-aqueous electrolyte secondary battery
11 positive electrode
12 negative electrode
13 separator
14 electrode assembly
16 outer housing can
17 sealing assembly
18, 19 insulating plate
20 positive electrode lead
21 negative electrode lead
22 groove portion
23 internal terminal plate
24 lower vent member
25 insulating member
26 upper vent member
27 cap
28 gasket

The invention claimed is:

1. A positive electrode active material for a non-aqueous electrolyte secondary battery, the positive electrode active material comprising:

a lithium-transition metal composite oxide represented by a composition formula $Li_xMn_yNi_zAl_aM_bO_{2-c}F_c$ wherein M contains Co, Ti and Nb, $1.0<x\leq1.2$, $0.4\leq y\leq0.8$, $0\leq z\leq0.4$, $0<a<0.01$, $0<b<0.03$, $0<c<0.1$, and $x+y+z+a+b\leq2$, b indicating a molar ratio of each of M; and the molar ratio (b) of each of M is in a range of $0.002<b<0.005$.

2. A non-aqueous electrolyte secondary battery comprising:

a positive electrode including the positive electrode active material according to claim 1;

a negative electrode;

a separator interposed between the positive electrode and the negative electrode; and a non-aqueous electrolyte.

3. The non-aqueous electrolyte secondary battery according to claim 2, wherein the lithium-transition metal composite oxide represented by the composition formula $Li_xMn_yNi_zAl_aM_bO_{2-c}F_c$ constitutes substantially 100 mass % of the positive electrode active material included in the positive electrode.

* * * * *